United States Patent
Singh et al.

(10) Patent No.: US 12,323,679 B2
(45) Date of Patent: Jun. 3, 2025

(54) STREAMING OF COMPOSITE ALPHA-BLENDED AR/MR VIDEO TO OTHERS

(71) Applicant: Lenovo (Singapore) Pte. Ltd., Singapore (SG)

(72) Inventors: Kuldeep Singh, Gurugram (IN); Serhii Pryvalov, Budapest (HU); Deepak Chirammel, Coimbatore (IN); Cole Heiner, Morrisville, NC (US); Mayan Shay May-Raz, Morrisville, NC (US); Raju Kandaswamy, Coimbatore (IN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 414 days.

(21) Appl. No.: 17/820,033

(22) Filed: Aug. 16, 2022

(65) Prior Publication Data

US 2024/0064387 A1    Feb. 22, 2024

(51) Int. Cl.
*H04N 21/81*    (2011.01)
*H04N 9/76*    (2006.01)
(Continued)

(52) U.S. Cl.
CPC .......... *H04N 21/816* (2013.01); *H04N 9/76* (2013.01); *H04N 21/234* (2013.01); *H04N 21/25816* (2013.01); *H04N 21/8547* (2013.01)

(58) Field of Classification Search
None
See application file for complete search history.

(56) References Cited

U.S. PATENT DOCUMENTS

2007/0178884 A1*  8/2007  Donovan ............... H04L 12/14
                                                    455/411
2016/0134932 A1*  5/2016  Karp .................... H04L 67/125
                                                    348/207.11
(Continued)

OTHER PUBLICATIONS

"Alpha compositing", Wikipedia, retrieved from https://en.wikipedia.org/wiki/Alpha_compositing on Jul. 14, 2022.
(Continued)

*Primary Examiner* — Junior O Mendoza
(74) *Attorney, Agent, or Firm* — John L. Rogitz; John M. Rogitz

(57) ABSTRACT

In one aspect, a first device includes a processor and storage accessible to the processor. The storage includes instructions executable by the at least one processor to receive, from a second device, a first web real-time communication (We-bRTC) stream. The first WebRTC stream includes first images associated with virtual content. The instructions are also executable to receive, from the second device, a second WebRTC stream. The second WebRTC stream includes second images from a camera in communication with the second device and is different from the first WebRTC stream. The second images include real-world red green blue (RGB) images from the camera. The instructions are then executable to execute alpha blending to generate a composite video in which the first images are overlaid, with at least partial transparency, on the second images. The instructions are also executable to stream the composite video to a third device.

19 Claims, 10 Drawing Sheets

(51) Int. Cl.
   *H04N 21/234*   (2011.01)
   *H04N 21/258*   (2011.01)
   *H04N 21/8547*  (2011.01)

(56) References Cited

U.S. PATENT DOCUMENTS

| | | | |
|---|---|---|---|
| 2020/0371673 A1* | 11/2020 | Faulkner | G06F 3/017 |
| 2023/0222741 A1* | 7/2023 | Gruen | H04N 13/376 |
| | | | 345/633 |
| 2023/0254524 A1* | 8/2023 | Hosoda | G06F 3/0481 |
| | | | 725/116 |
| 2024/0040085 A1* | 2/2024 | Krol | H04N 7/157 |
| 2024/0146999 A1* | 5/2024 | Seed | H04N 21/258 |

OTHER PUBLICATIONS

"CSS", Wikipedia, retrieved on Jul. 14, 2022 from https://en.wikipedia.org/wiki/CSS.
"ThinkReality A3 Industrial Edition Applications Overview", LENOVO, retrieved from https://support.lenovo.com/us/en/videos/nvid500337 on Jul. 14, 2022.
"WebRTC", Wikipedia, retrieved from https://en.wikipedia.org/wiki/WebRTC on Jul. 14, 2022.

\* cited by examiner

STREAMING OF COMPOSITE ALPHA-BLENDED AR/MR VIDEO TO OTHERS

FIELD

The disclosure below relates to technically inventive, non-routine solutions that are necessarily rooted in computer technology and that produce concrete technical improvements. In particular, the disclosure below relates to streaming composite alpha-blended AR/MR video to others.

BACKGROUND

As recognized herein, headsets can be tethered to a mobile device so that the headset can present augmented reality (AR), virtual reality (VR), and/or mixed reality (MR) content under control of the mobile device. However, the disclosure below recognizes that current systems do not allow adequate sharing of what the user sees as part of the AR, VR, or MR experience with others who might not have their own headsets to view the experience. Therefore, there are currently no adequate solutions to the foregoing computer-related, technological problem.

SUMMARY

Accordingly, in one aspect a device includes at least one processor and storage accessible to the at least one processor. The storage includes instructions executable by the at least one processor to receive, from a second device, a first web real-time communication (WebRTC) stream. The first WebRTC stream includes first images associated with virtual content. The instructions are also executable to receive, from the second device, a second WebRTC stream. The second WebRTC stream includes second images from a camera in communication with the second device and is different from the first WebRTC stream. The second images include real-world red green blue (RGB) images from the camera. The instructions are then executable to execute alpha blending to generate a composite video in which the first images are overlaid, with at least partial transparency, on the second images. The instructions are also executable to stream the composite video to a third device different from the first and second devices.

In various example embodiments, the first device may be a server, and the second and third devices may be client devices. Additionally, the virtual content may include one or more of augmented reality (AR) content, virtual reality (VR) content, and/or mixed reality (MR) content.

Also in example embodiments, the first images may show the virtual content from a virtual perspective of a user while viewing the virtual content using the second device, and the second images may show real-world content according to a field of view of a headset being used by the user to view the virtual content.

Still further, in various examples the first images may show one of left-eye virtual content and right-eye virtual content. If desired, the instructions may then be executable to request, from the second device, one of the left-eye virtual content and the right-eye virtual content.

Additionally, in various example implementations the instructions may be executable to use timestamps to match respective frames of the first images to respective frames of the second images to generate the composite video.

Also in certain examples, the instructions may be executable to stream the composite video to the third device responsive to receipt of a pin from the third device. In certain cases, the instructions may even be executable to provide the pin to the first device for out-of-band sharing of the pin.

Still further, if desired the instructions may be executable to receive an audio stream from the second device and include the audio stream with the composite video streamed to the third device.

Additionally or alternatively, the instructions may be executable to receive third images from the second device, where the third images may correspond to content presented on a first display of the second device and where the first images may correspond to virtual content presented at a headset display in communication with the second device. The third images may be different from the first images and the first display may be different from the headset display. The instructions may then be executable to stream, to the third device, the third images with the composite video. For instance, the instructions may be executable to stream, to the third device, the composite video and the third images together as a single video stream that shows a first panel including the composite video and that shows a second panel including the third images. The first panel may therefore be different from the second panel.

In another aspect, a method includes determining that a user is logged in, via a first device, to a streaming service. The method also includes, based on the user being logged in to the streaming service, establishing a socket connection with the streaming service. The method then includes using the socket connection to transmit, to the streaming service, a first web real-time communication (WebRTC) stream that includes first images associated with virtual content and a second WebRTC stream that includes second images from a camera in communication with the first device. The second images include real-world red green blue (RGB) images from the camera. The first images include one but not both of left eye images from stereoscopic video data and right eye images from the stereoscopic video data.

Thus, in certain examples the method may include, based on the user being logged in to the streaming service, providing a pin at the first device. The pin may provide access from other devices to a composite video of the first and second images.

Also in certain examples, the method may include using the socket connection to transmit, to the streaming service, a third WebRTC stream that includes audio data. The audio data may be produced by the first device and correspond to the visual content, and/or indicate a voice of the user as detected by a microphone in communication with the first device. Additionally, the method may include using the socket connection to transmit, to the streaming service, a fourth WebRTC stream that includes third images presented on a first display of the first device. The first display may be different from a second display controlled by the first device to present the first images, and the third images may be different from the first images.

In still another aspect, at least one computer readable storage medium (CRSM) that is not a transitory signal includes instructions executable by at least one processor to receive, at a first device and from a second device, a first stream including first images associated with virtual content. The instructions are also executable to receive, at the first device and from the second device, a second stream including second images from a camera in communication with the second device. The second images include real-world red green blue (RGB) images from the camera. The instructions are then executable to execute alpha blending to generate a composite video in which the first images are overlaid, with at least partial transparency, on the second images. The instructions are also executable to stream the composite video to a third device different from the first and second devices.

In certain examples, the first images may show the virtual content from a perspective of a user while viewing the virtual content using the second device, and the second images may show real-world content according to a field of view of a headset being used by the user to view the virtual content.

Also in certain examples, the first images may show one but not both of left-eye virtual content and right-eye virtual content.

The details of present principles, both as to their structure and operation, can best be understood in reference to the accompanying drawings, in which like reference numerals refer to like parts, and in which:

DETAILED DESCRIPTION

Figure 1:
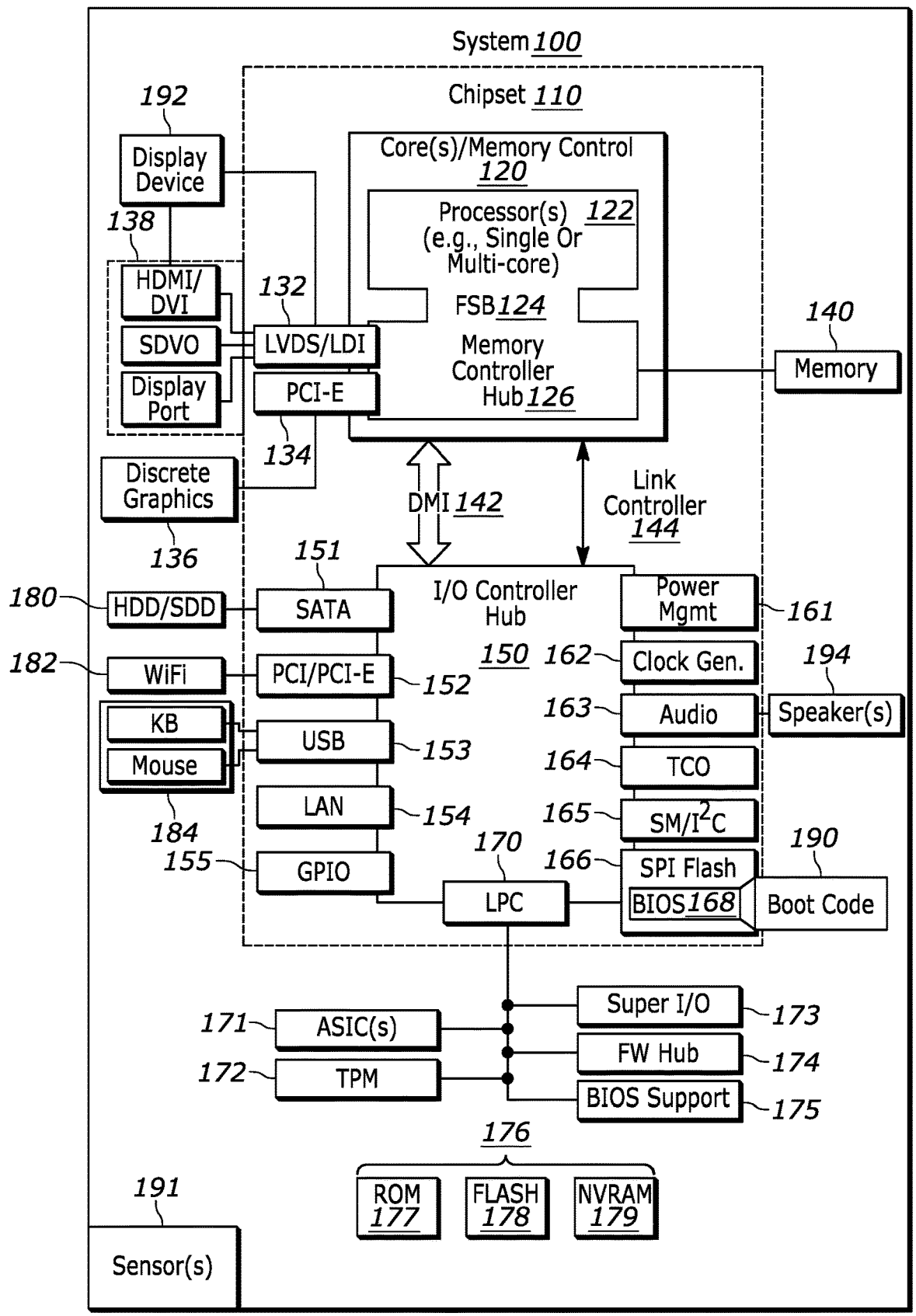
FIG. 1 is a block diagram of an example system consistent with present principles.

Among other things, the detailed description below discusses an ARCast Cloud that can stream AR glass and AR camera streams to a web portal, and the web portal may blend these two streams to simulate the AR environment the user is in to others. The ARCast Cloud solution thus provides an easy way to connect AR glasses to a web portal anywhere in the world with internet so others can join the stream from the AR glass and see what the user is seeing. Thus, the ARCast Cloud may be used for streaming mixed reality and other experiences to the remote users.

Thus, in one aspect a web portal can list the AR Glasses registered to use portal services. A viewer can access the web portal on a web-browser on his/her PC to then access various streams.

Also in one aspect, an ARCast mobile app may be executed at the streaming device itself, where the user can start an ARCast Cloud session and web portal users can see an option to join the stream from the AR glass. Upon joining the session, the ARCast starts WebRTC sessions with two video tracks—one for a camera stream and another for texture displayed on the glass. These two streams are shown blended on the web-browser using CSS overlay with alpha blending applied on the glass video such that viewers see the glass display feed super-imposed over the camera feed. This simulates a mixed reality experience in real-time over the internet (e.g., non-stereoscopically).

Thus, as one example process flow, the glass user may start the stream from their phone. The locally-executing ARCast application may check for a portal connection. If the user is logged in, a socket connection may be established with the portal by polling the signaling servers and actually establishing a peer connection. Once the peer connection is successful, then the user's device may create two video tracks—one for transmitting the glass content and another for transmitting the camera content. If the user has enabled audio, a third track may be created for the audio stream. If the user has enabled sharing the phone screen itself, then a fourth track may be created for phone content streaming.

On the portal end, for the selected device if the peer connection is established then a provision to "Join Stream" is presented to a viewer. Upon joining the stream, the viewer is presented with a PIN entry page to validate the viewer. The received PIN may then be transmitted as an encrypted socket message to the peer running in the phone, the phone may validate the PIN, and the phone may then return success or failure. Upon successful validation of the PIN, the first two video stream tracks (camera, glass) available via WebRTC may be blended using CSS such that the camera track is at the background and the glass track is on the top with applied opacity to get a see-through effect. If there is an audio stream available in WebRTC, the audio stream may start playing for the viewer as well. The web viewer may have the ability to mute/unmute the audio stream via the web interface if desired as well.

Thus, the blended content may be presented to the user as mixed reality stream. If the audio track is available, then it may be played along with the blended content. If the phone cast track is available, then it too may be played in a separate area of the portal. This will let the remote viewer know what actions are being performed in the user's phone by the user themselves.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, one or more forward-facing cameras might be on a headset being worn by a user so that the system 100 may execute computer vision (e.g., for 3D real-world location tracking), and one or more inward-facing cameras might also be on the headset for eye tracking.

In addition to or in lieu of the foregoing, the sensors 191 may include one or more inertial measurement sensors that might be included in an inertial measurement unit (IMU) for location tracking and device orientation identification (e.g., dead reckoning for location tracking, orientation identification to determine whether to present content in landscape or portrait orientation). For example, the system 100 may be embodied in a mobile device and the inertial measurement sensors may be located on the mobile device to determine whether the user is holding the system 100 in portrait orientation where the long axis of the device/display is oriented vertically or in landscape orientation where the long axis of the device/display is oriented horizontally. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as described herein. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
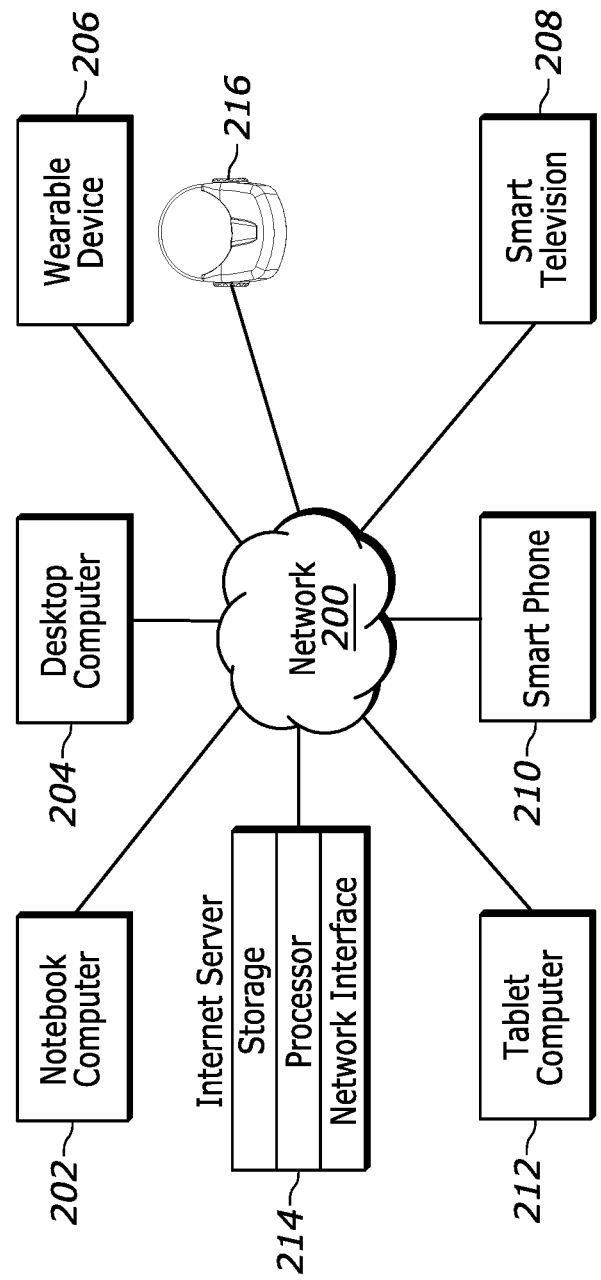
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
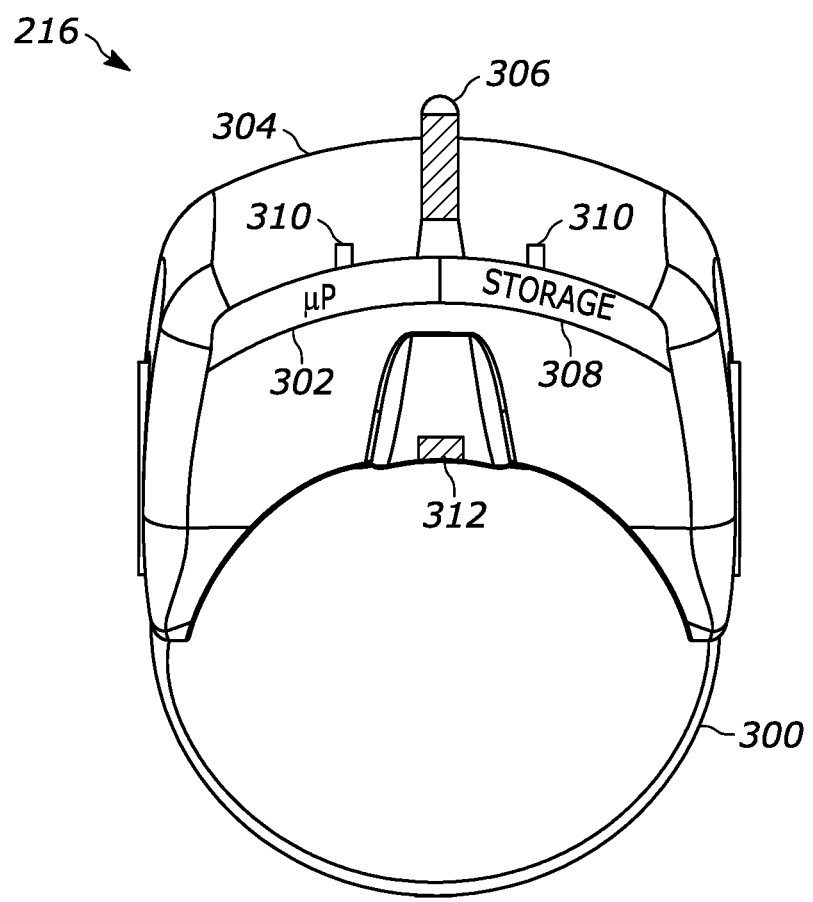
FIG. 3 illustrates an example headset that may be used to present an AR, MR, or VR presentation/simulation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of respective left eye and right eye stereoscopic images using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used for gesture recognition to recognize gestures made by the user using their hand, arm, etc. However, further note that the camera(s) 306 may be located at other headset locations as well. Also note that in some examples, inward-facing cameras 310 may also be mounted within the headset 216 and oriented to image the user's eyes for eye tracking while the user wears the headset 216 (e.g., to determine where a user is looking in 3D space to select a real world or graphical object).

Additionally, the headset 316 may include storage 308 accessible to the processor 302 and coupled to the housing 300, a microphone 312 for detecting audio of the user speaking, and still other components not shown for simplicity such as a network interface for communicating over a network such as the Internet and a battery for powering components of the headset 216 such as the camera(s) 306. Additionally, note that while the headset 216 is illustrated as a head-circumscribing AR headset, it may also be established by computerized smart glasses or another type of headset including other types of VR and MR headsets. For example, the headset may be established by a VR headset that may have a non-transparent display but that still provides an AR experience by presenting a feed from the camera 306 on the non-transparent display along with virtual content.

Figure 4:
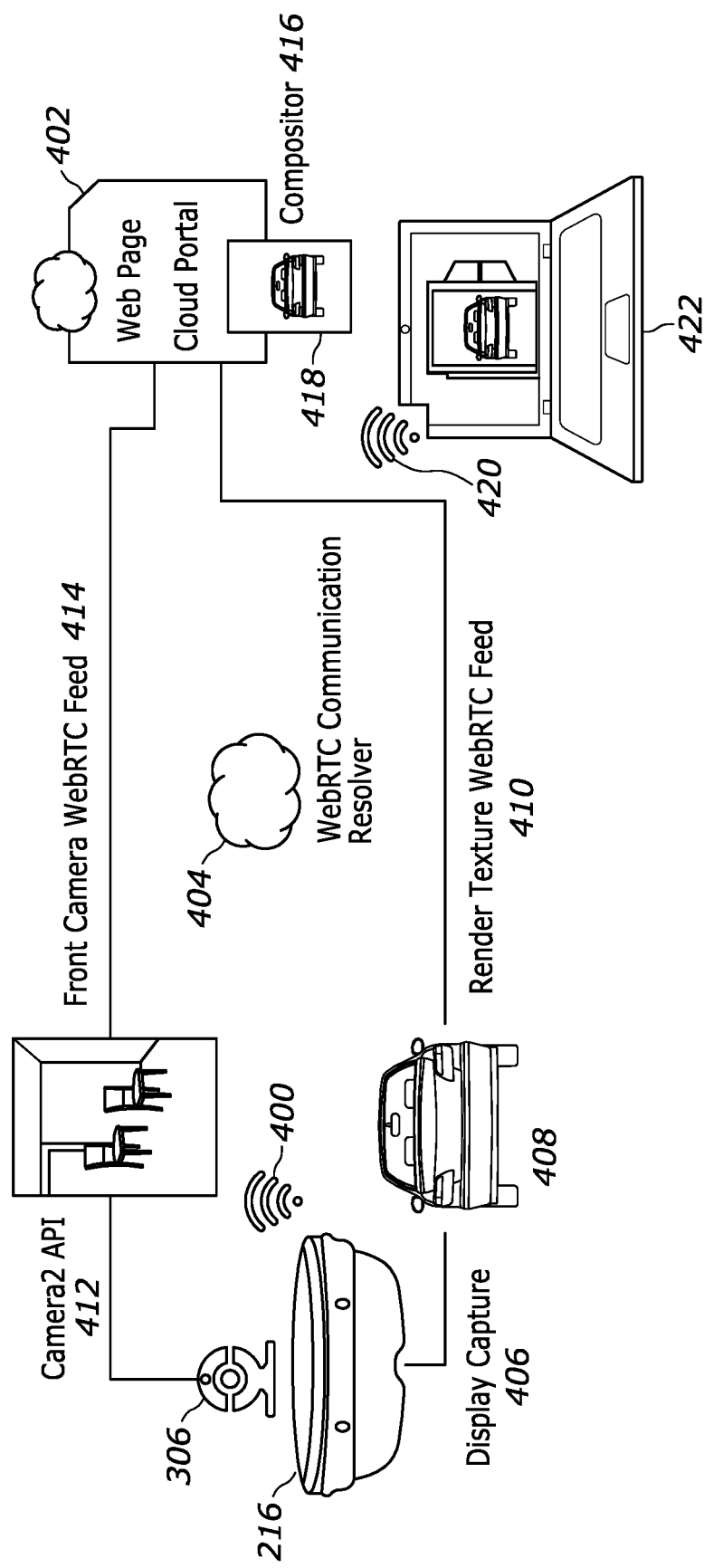
FIG. 4 shows an example schematic of a WebRTC communication session established between a cloud server, a casting user's client device, and a viewing person's client device.

Now in reference to FIG. 4, a schematic diagram illustrating present principles is shown. The headset 216 with forward-facing camera 306 is shown. The headset 216 (and associated but not shown local controlling device such as a smartphone that executes simulations and presents AR, MR and/or VR content at the headset 216) is also shown as being in Wi-Fi/Internet communication 400 (and/or other type of communication such as Bluetooth communication) with a server 402 that provides cloud hosting services and a cloud portal as well as web page access for content streaming. The communication may include web real-time communication (WebRTC) using a WebRTC communication resolver 404.

Thus, display capture 406 of virtual content (a 3D graphical object vehicle 408 in this example) presented on the display of the headset 216 may be provided to the server 402 as a render texture through a first WebRTC feed/stream 410. An Android camera2 application programming interface (API) 412 may also be used to provide, to the server 402, a real-time livefeed from the camera 306 as a front camera WebRTC feed/stream 414. Other WebRTC streams may also be provided to the server 402 from the headset 216 and/or device controlling the headset (e.g., again, local smartphone or tablet computer on the same Wi-Fi or Bluetooth network as the headset), such as one or more audio streams and/or a stream of the display content of the controlling device itself as will be described further below.

FIG. 4 also shows that the server 402 may execute a compositor 416 to provide a composite audio/video stream 418 over Wi-Fi/Internet/Bluetooth communication 420 to one or more remotely-located client devices 422 such as a laptop computer as shown so that others can livestream a view of a user of the headset 216 as the user engages in an AR/VR/MR simulation so that the other people can see the real-world field of view (FOV) the user sees in combination with the overlaid virtual objects themselves (including vehicle 408) to thus view a combined real-world/virtual FOV similar to the one the user themselves sees while immersed in the simulation.

Figure 5:
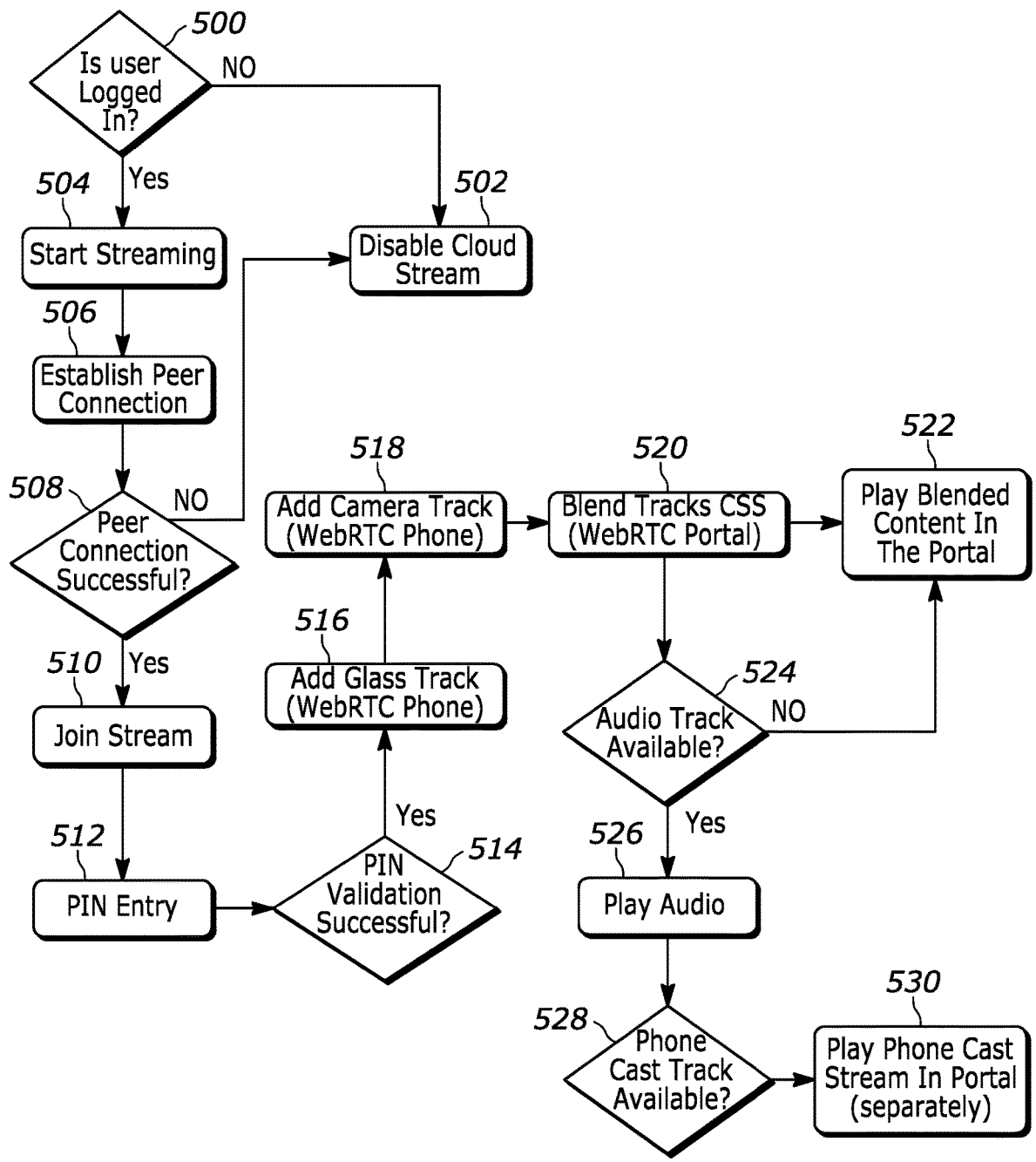
FIG. 5 shows example overall logic in example flow chart format that may be executed by various devices consistent with present principles.

FIG. 5 further illustrates through example overall logic that may be executed by one or more devices in communication with each other, such as a simulation client device such as the headset 216 and/or connected/controlling device such as a smartphone, a server, and other viewer devices consistent with present principles. Note that while the logic of FIG. 5 is shown in flow chart format, other suitable logic may also be used.

Beginning at decision diamond 500, a client device and/or the server may determine whether the user engaging in the AR/VR/MR simulation is logged into a cloud service, such as using a username and password. A negative determination at diamond 500 may cause the logic to proceed to block 502 where the server disables cloud streaming for the user. However, an affirmative determination at diamond 500 instead causes the logic to proceed to block 504 where the headset may start streaming content to the server, including real-time feeds of the virtual content presented at the client device and a real-world camera feed of the user's FOV.

From block 504 the logic may proceed to block 506 where the client device and server may establish a peer connection, e.g., using a socket connection. Thereafter the logic may proceed to decision diamond 508.

At diamond 508 the client device and/or server may determine whether the peer connection has been successfully established. A negative determination at diamond 508 may cause the logic to proceed back to block 502 as described above or, alternatively, to block 506 to reattempt establishing a peer connection.

However, an affirmative determination at diamond 508 may instead cause the logic to proceed to block 510 where another viewer device attempts to join the stream so another person at the other viewer device can view it. But first, assuming the stream is being multi-casted for authorized users (rather than broadcasted publicly without any authentication, which is another example embodiment), at step 512 a pin is received at the server from the other viewer(s) seeking access to the composite audio/video stream. The logic may then move to decision diamond 514 where the server may determine whether pin validation has been successful. If pin validation was not successful, the server may decline to provide the composite audio/video stream to the requesting viewer, but assuming pin validation was successful the logic may instead move to block 516.

At block 516 the server may receive a glass track via WebRTC from the user's client device(s) (e.g., smartphone and/or connected "glass" headset) that includes the virtual content being presented to the user via the headset itself. The logic may then proceed to block 518 where the server may receive, via WebRTC from the user's client device(s), a real-time camera feed from the headset's camera that mimics the user's own real-world FOV through the headset to add the corresponding camera feed/track to the glass track and blend the two at block 520 using alpha blending. Thus, the two tracks may be blended on the web-browser accessible server (for web-browser streaming to others via a WebRTC portal) using a cascading style sheet (CSS) with alpha blending applied for the glass track video so that other viewers can see the glass display feed super-imposed over the glass's camera feed.

The logic may then proceed to block 522 where the blended content may be played in the WebRTC portal (e.g., streamed via the portal over WebRTC and/or HTML to the other viewer devices which themselves may be client devices such as smartphones, laptop computers, wearable devices, other headsets, etc.).

However, in examples where audio from the user's client device might be provided to the other viewers as well, the logic may proceed from block 520 to decision diamond 524 instead to determine whether one or more audio tracks are in fact available. The audio tracks may include audio of the simulation itself, including virtual sounds produced as part of the AR/VR/MR simulation. Additionally or alternatively, the audio tracks may include audible input from the user themselves, including words and other sounds spoken into a microphone of the user's headset or connected device. A negative determination at diamond may cause the logic to move to block 522, but an affirmative determination may instead cause the logic to proceed to block 526 where the audio may be streamed to the other viewer devices along with the composite/blended video.

As indicated above, the user's headset may be controlled by another local client device such as a connected smartphone that actually executes the AR/VR/MR simulation and controls the headset to present the corresponding virtual content. Thus, in some examples the content displayed on this connected device may also be streamed to the viewers via WebRTC and, accordingly, the logic in some examples may move from block 526 to decision diamond 528 to determine whether a phone cast track (e.g., a cast/stream of that display's content) is in fact available. If none is available, the logic may proceed back to blocks 522 and/or 526. But assuming one is available, the logic may instead proceed to block 530 where the server may stream/play via WebRTC the phone cast stream in the portal (e.g., separately from the composite alpha-blended video) for the other viewers to view via the portal.

Figure 6:
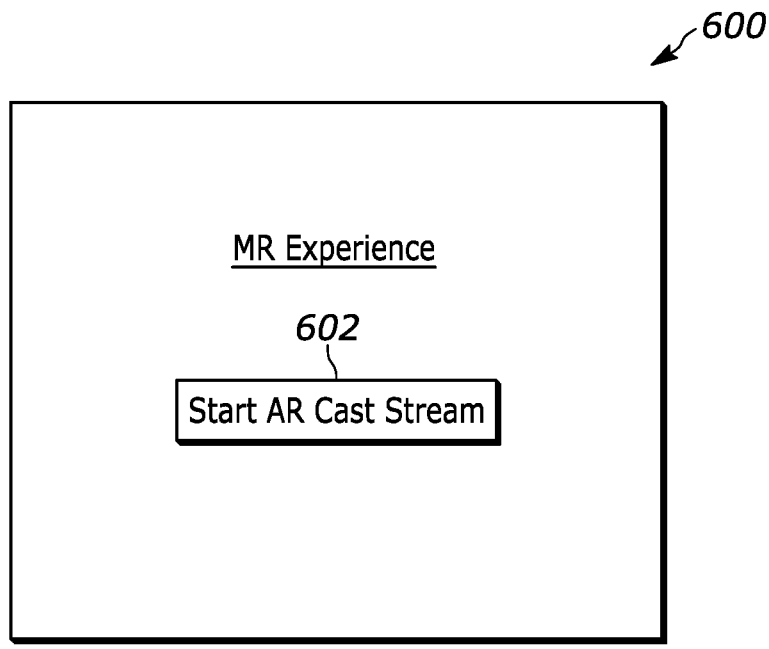
FIGS. 6 and 7 show example graphical user interfaces (GUIs) that may be presented on a streaming user's client device consistent with present principles.
Figure 7:
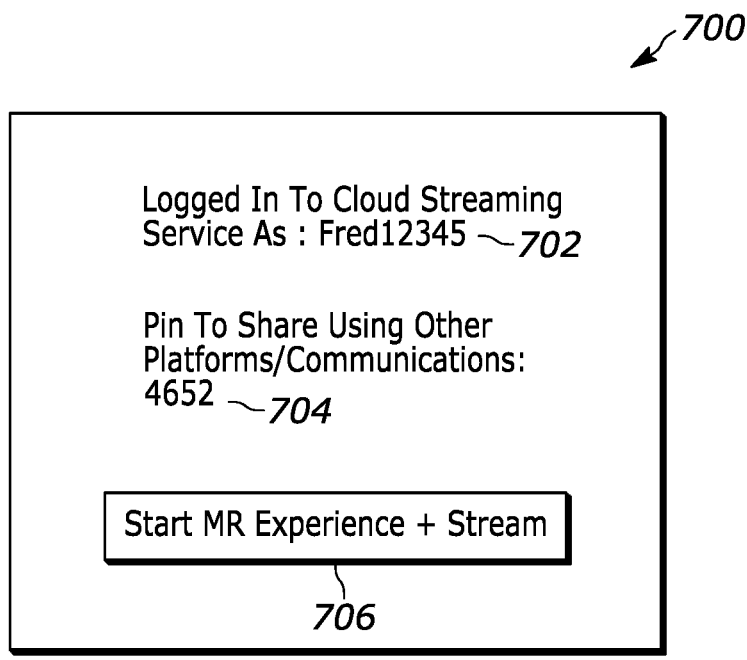

Continuing the detailed description in reference to FIG. 6, an example graphical user interface (GUI) 600 is shown that may be presented on a display of a user's client device to initiate streaming of AR/VR/MR content with which they are or will be engaging to others. For example, the GUI 600 may be presented on the display of the headset 216 and/or display of a connected smartphone or other client device. As shown, the GUI 600 includes a selector 602 that may be selectable to initiate an ARCast stream of the AR/MR/VR experience, including the virtual content itself, as well as a stream of the headset's camera according to the user's FOV.

Responsive to selection of the selector 602, the user's client device(s) may initiate communication with a cloud server according to the description above to login and establish WebRTC connections for streaming. Thus, based on the communication the GUI 700 may be presented. The GUI 700 may include an indication 702 of the username the user is using for active login to the server/streaming service, assuming the user has already logged in. Based on the login and selection of the selector 602, the client device may receive a pin 704 from the server/cloud service. The user may then share the pin 704 with others using out-of-band communication (e.g., communication using platforms and/or means of communication other than WebRTC/communication via the ARCast streaming server/cloud service portal itself). The out-of-band communication may therefore include the user sharing the pin with others via short message service (SMS) text message, via audio phone call, via email, via social media post or direct message, etc.

The after the user has shared the pin with his/her desired viewers, the user may select the selector 706 to initiate the AR/VR/MR simulation to present the virtual content at the user's headset and to also begin streaming via WebRTC as described above.

Figure 8:
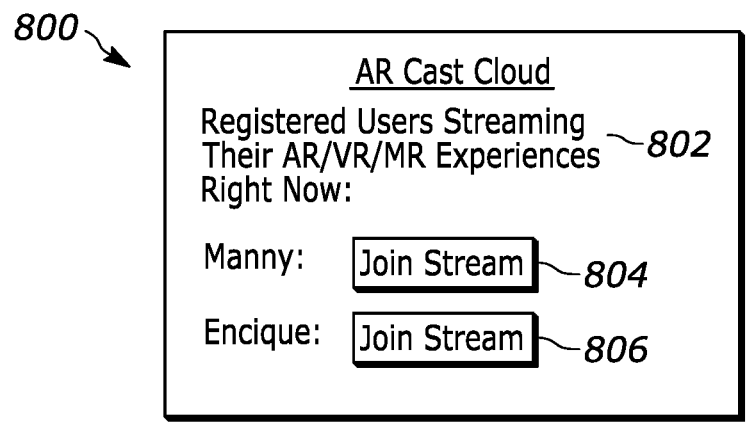
FIGS. 8 and 9 show example GUIs that may be presented on a viewing person's client device consistent with present principles.
Figure 9:
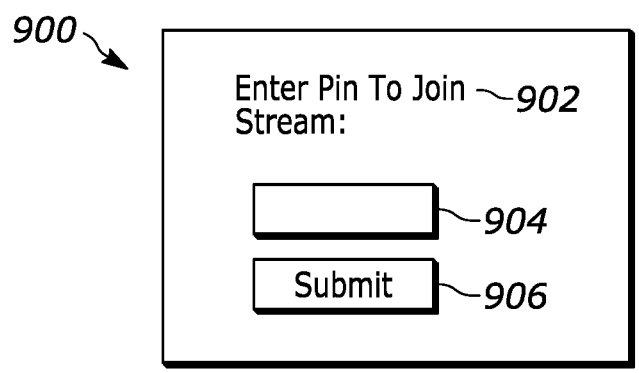

FIG. 8 shows an example GUI 800 that may be presented at a viewer's client device after login. The GUI 800 may include a list 802 of various users that are currently streaming their AR/VR/MR composite videos via an ARCast cloud server. Thus, the viewer may elect the selector 804 to view a first composite video stream of a first user or selector 806 to view a second composite video stream of a second, different user.

Responsive to one of the selectors 804, 806, the viewer's client device may communicate with the server and present the GUI 900. The GUI 900 may include a prompt 902 for the viewer to enter a pin for the associated composite stream as provided out-of-band to the viewer. The viewer may then enter the appropriate pin into the input field 904 and select the submit selector 906 to communicate the pin back to the server for the server to then begin streaming the composite video to the viewer's device.

Figure 10:
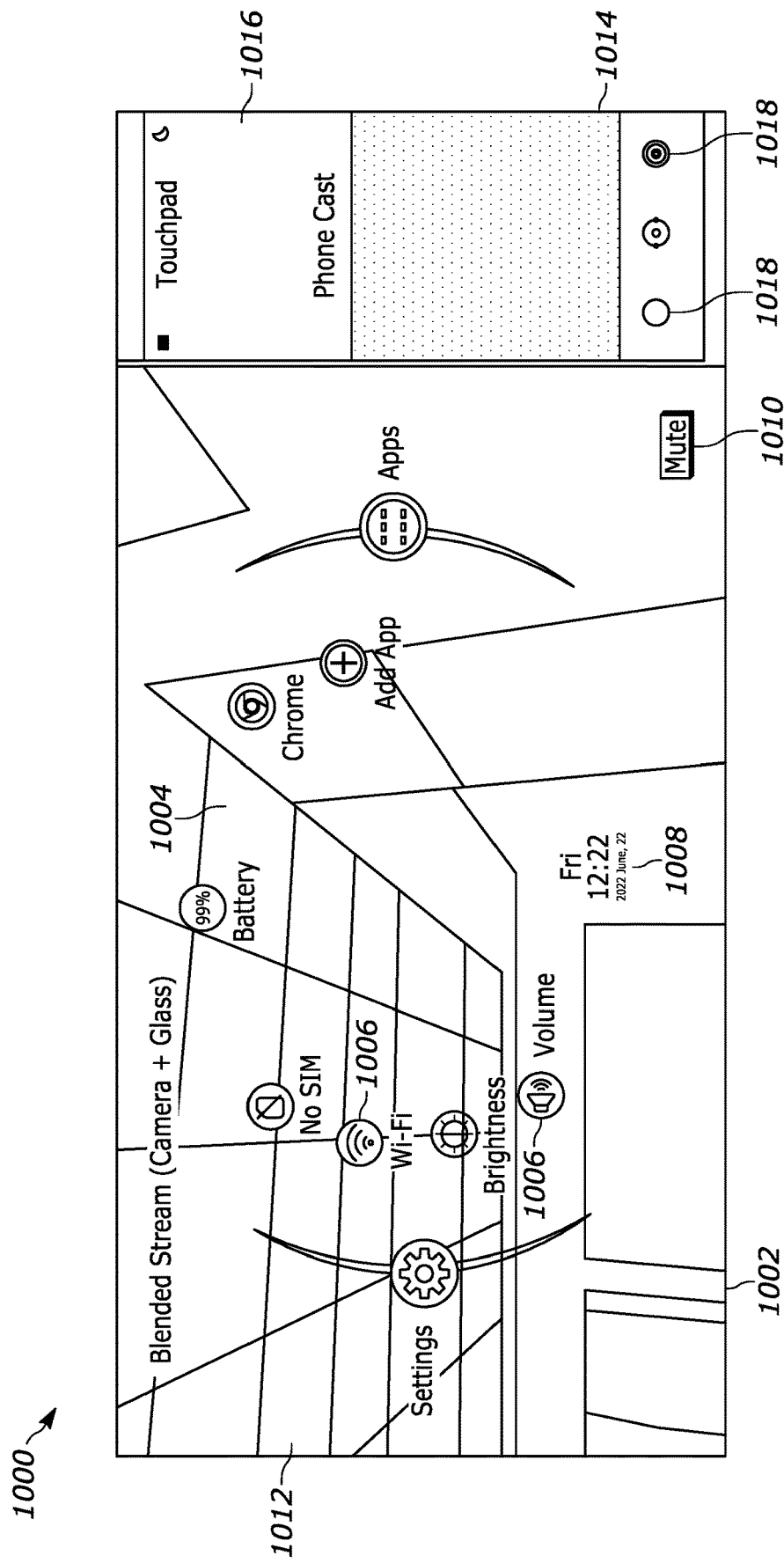
FIG. 10 shows an example composite video stream GUI as may be presented on a viewing person's client device consistent with present principles.

FIG. 10 then shows an example GUI 1000 that may be presented on the display of the viewer's device to view the composite video stream 1002 from the source streamer. As may be appreciated from the GUI 1000, the alpha-blended stream 1002 shows the streaming user's real-world environment from the perspective of the forward-facing camera on the user's headset along with overlaid virtual content 1004. In this example, the virtual content 1004 includes various selectors 1006 to control various aspects of the user's headset itself. As shown, the selectors 1006 may include a selector to enter a settings menu, a selector to enter an apps list menu, a power selector/battery status selector, a SIM selector, a Wi-Fi/network options selector, a brightness selector, a volume selector, an Internet browser selector, and an add app selector. The virtual content may also include an indicator 1008 of a current local time of day and date at the current real-world geographical location of the streaming user.

Assuming audio is also being streamed as set forth above, a mute selector 1010 may also be presented on the GUI 1000 as superimposed over the stream 1002. Thus, the viewer may select the selector 1010 to mute or unmute local presentation of the audio at the viewer's device if the viewer so chooses.

Note here that the foregoing features from the GUI 1000 are all presented in a first panel 1012 including the composite video. Also note that the GUI 1000 shows a different panel 1014 including additional images 1016 showing the content presented on the display of the user's other client device that is connected to the user's headset. For example, the images may show the home screen of the user's smartphone that is controlling the user's headset. Or the images may show a screen of an application (app) that is currently active and presented at the smartphone display. Thus, in certain examples the images may show selectors 1018 presented at the user's device display, such as buttons to control the connected headset itself. In various examples the selectors 1018 are selectable by the user at the sourcing device itself but are not selectable via the panel 1014 presented at the viewer's own device. However, in other examples, such as where the user grants permission, the selectors 1018 may in fact be selectable by the viewer(s) in order for the viewers to control the user's device and/or the AR/MR/VR simulation itself.

Figure 11:
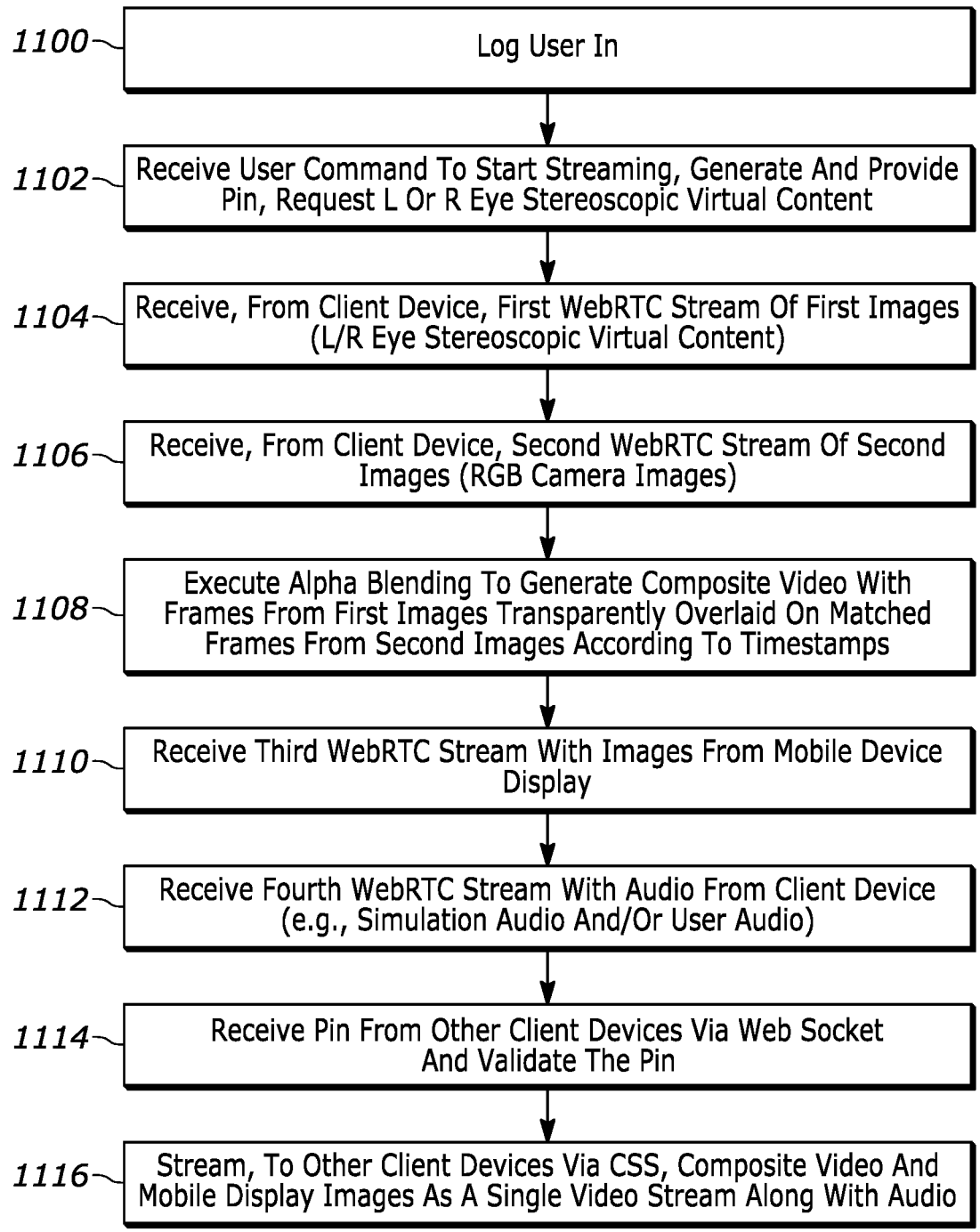
FIG. 11 shows example logic in example flow chart format that may be executed by an ARCast server consistent with present principles.

Referring now to FIG. 11, it shows example logic consistent with present principles that may be executed by an ARCast cloud server such as the server 402 discussed above. Note that while the logic of FIG. 11 is shown in flow chart format, other suitable logic may also be used.

Beginning at block 1100, the server may log the user into the streaming service, e.g., based on receipt of username and password, biometric data, etc. The logic may then proceed to block 1102 where the server may receive a command from the user to start streaming an AR/VR/MR presentation as disclosed herein. Responsive to the command, the server may also generate and/or provide a pin (e.g., random pin generated using a random pin generator algorithm) for others to use to access the user's streams consistent with present principles.

Also at block 1102, in some examples the server may even request left eye or right eye stereoscopic video content from the user's headset/connected device. Thus, images of virtual content as presented by the user's device on one of the left eye or right eye displays of the user's headset may be streamed as the virtual content images so that the virtual content images can be viewed on a computer display such as a smartphone display or laptop display as a single feed rather than concurrently viewing two different and slightly offset versions of the same virtual content as generated for the user's left eye and right eye for stereoscopic 3D presentation, which would give a disjointed look to others not using their own headsets with stereoscopic capability. Accordingly, even though the left eye or right eye virtual content may give a slightly different perspective to the viewer than what the user themselves sees stereoscopically through the headset, the perspective is close enough for the viewer to still see things from the same general perspective as the user themselves using a single display without stereoscopic rendering.

The logic may therefore move from block 1102 to block 1104 where the server may actually begin receiving, from the user's device, a first WebRTC stream of first images associated with the virtual content (the left eye or right eye images themselves). The first images may show the virtual content from a virtual perspective of the user while viewing the virtual content using the headset.

The logic may then move to block 1106 where the server may receive, from the user's device, a second WebRTC stream including second images from a camera in communication with the user's device (e.g., a camera on the headset such as the camera 306 described above). The second WebRTC stream may be different from the first WebRTC stream, and the second images may include real-world red green blue (RGB) images from the camera itself. Thus, the second images may show real-world content according to a field of view of the headset being used by the user to view the virtual content.

The logic may then move to block 1108 where the server may execute alpha blending to generate a composite video in which the first images are overlaid, with at least partial transparency, on the second images. Timestamps for each frame of the first and second images as received from the user's device may then be used so that respective frames of the first images may be matched to respective frames of the second images that have the same timestamp time.

Thereafter, the logic may proceed to block 1110 where, if available, the server may receive, via a third WebRTC stream, third images from the user's device that correspond to content presented on a display of the user's mobile or other device that is being used in tandem with the user's headset to present the virtual AR/MR/VR content locally to the user themselves at the headset display. Thus, the first images may correspond to the virtual content presented at the headset's display (in communication with the mobile or other device) and the third (different) images may be images corresponding to the content presented at the mobile device display.

After block 1110 the logic may proceed to block 1112 where the server may receive, via a fourth WebRTC stream, one or more audio streams from the user's device(s), including virtual content simulation audio and/or audio of the user speaking.

From block 1112 the logic may then proceed to block 1114 where the server may receive, via web socket, the pin it already provided to the user from other client devices of viewers who wish to observe the user's streams. The server may then validate the pin. Assuming a valid pin has been received, the logic may then proceed to block 1116 where the server may stream, to those other client devices of the viewers and using CSS (in embodiments where the viewers are accessing the streams via hypertext markup language (HTML) using a web browser executing at their devices), the composite video stream generated at block 1108 along with the received audio stream(s) and third image streams. Note here that the audio streams and third images may have their own timestamp information for matching of respective portions thereof to respective portions of the composite video stream based on same time of day. In some examples, the composite video and third images may be streamed as a single video stream (e.g., showing a first panel including the composite video and showing a second panel including the separate mobile device display images as described above).

Figure 12:
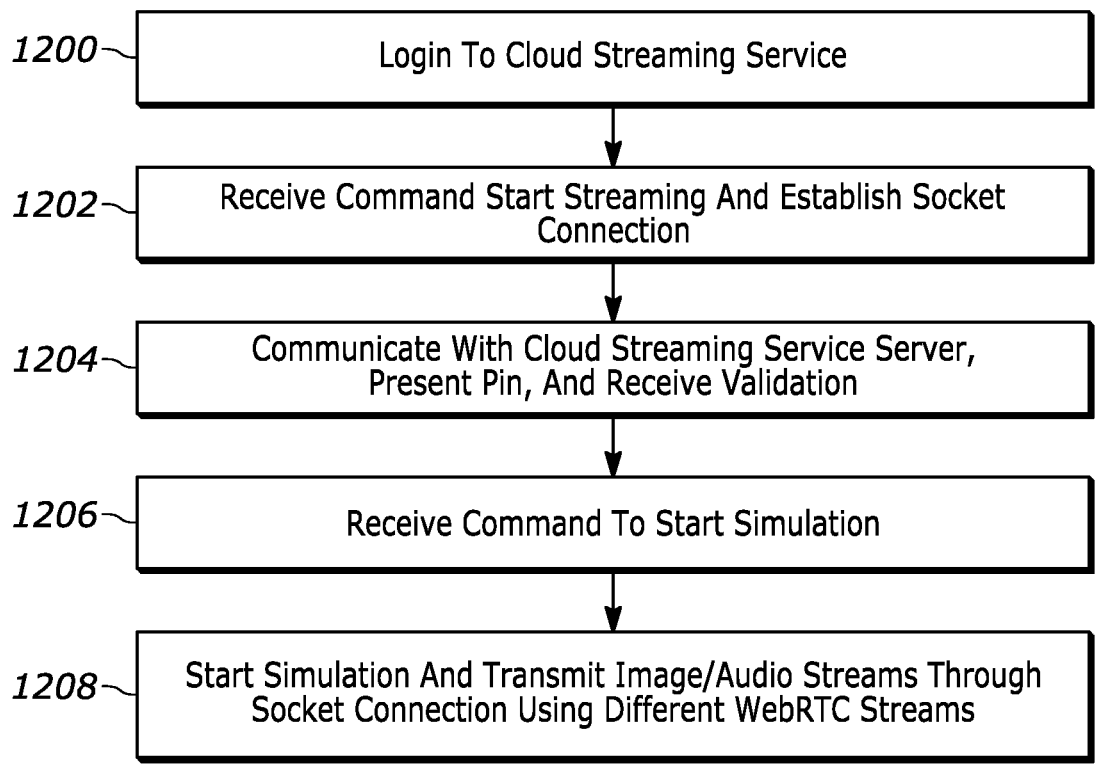
FIG. 12 shows example logic in example flow chart format that may be executed by a streaming user's client device consistent with present principles.

Continuing the detailed description in reference to FIG. 12, it shows example logic consistent with present principles that may be executed by a user's client device to stream content to others as described herein. Note that while the logic of FIG. 12 is shown in flow chart format, other suitable logic may also be used.

Beginning at block 1200, the device may log the user into the streaming service, e.g., using username and password, biometric authentication, etc. The logic may then proceed to block 1202 where the device may receive a command from the user to start streaming an AR/VR/MR presentation as disclosed herein and, in response, initiate and establish a socket connection to the server.

The logic may then proceed to block 1204 where the device may communicate with the server/cloud streaming service to present a pin locally at the device for the user to then share the pin with others as discussed herein (e.g., and the device may even receive validation of the pin from the server based on the pin being entered by others to the system). Thereafter the logic may proceed to block 1206 where the device may receive a command from the user to begin the AR/VR/MR simulation.

The logic may then proceed to block 1208 where the device may use the socket connection to transmit, to the streaming service, the first WebRTC stream that includes the first images associated with the virtual content, the second WebRTC stream that includes second images from the local camera, the third WebRTC stream that includes audio data (e.g., produced by the user's device and corresponding to the visual content, and/or indicating a voice of the user as detected by a microphone on the user's device), and the fourth WebRTC stream that includes third images presented on the user's mobile device display that is separate from the user's headset display. The other people may then ultimately receive a combined stream as described herein at their own respective client devices to audibly and visually observe the user engaging in the 3D simulation (e.g., receive the combined stream through a socket connection using a WebRTC stream).

Figure 13:
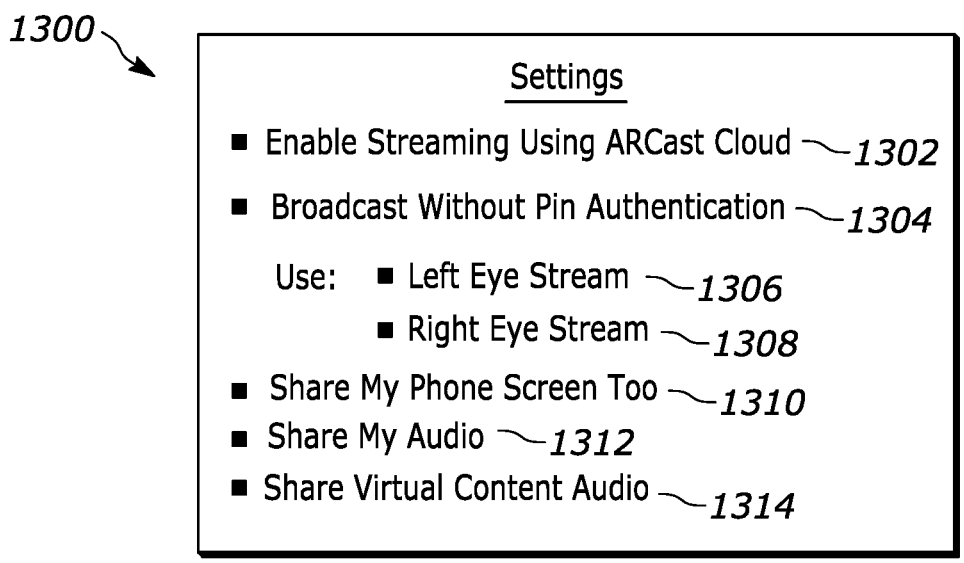
FIG. 13 shows an example settings GUI that may be presented on a display of a stream user's client device to configure one or more settings of the device to operate consistent with present principles.

Now in reference to FIG. 13, it shows an example graphical user interface (GUI) 1300 that may be presented on the display of an end-user's device such as the user's headset or mobile device display to configure/enable one or more settings related to AR/VR/MR presentations as described herein. The settings GUI 1300 may be reached by navigating a settings menu of the device or a dedicated app menu for a given VR/AR/MR simulator, for example. Also note that in the example shown, each option discussed below may be selected by directing touch or cursor or other input to the respective check box adjacent to the respective option.

As shown in FIG. 13, the GUI 1300 may include an option 1302 that may be selectable a single time to set or configure the device/system to undertake present principles for multiple instances in the future. For example, selection of the option 1302 may configure the device to execute the logic of FIG. 12 as well as to execute the other actions described above in reference to a user's headset and/or mobile device. If desired, the user may even select the sub-option 1304 to set the ARCloud Cast server itself to broadcast the user's streams without requiring an access pin as described above.

The GUI 1300 may also include respective options 1306, 1308 to use either a left eye image stream or right eye image stream, respectively, to stream the virtual content images to the server as described above. The GUI 1300 may also include an option 1310 to stream the separate mobile device's screen display as well as also described above. Still further, if desired an option 1312 may be selected to stream the user's audible input as spoken by the user while streaming, as well as an option 1314 to stream the AR/VR/MR simulation's own audio as well.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
receive, from a second device, a first web real-time communication (WebRTC) stream, the first WebRTC stream comprising first images associated with virtual content;
receive, from the second device, a second WebRTC stream, the second WebRTC stream comprising second images from a camera in communication with the second device, the second WebRTC stream being different from the first WebRTC stream, the second images comprising real-world red green blue (RGB) images from the camera;
execute alpha blending to generate a composite video in which the first images are overlaid, with at least partial transparency, on the second images; and
stream the composite video to a third device different from the first and second devices;
wherein the first images show one of: left-eye virtual content or right-eye virtual content; and
wherein the instructions are executable to:
request, from the second device, one of: the left-eye virtual content or the right-eye virtual content.

2. The first device of claim 1, wherein the first device is a server.

3. The first device of claim 2, wherein the second and third devices are client devices.

4. The first device of claim 1, wherein the left or right eye virtual content, according to the request, comprises one or more of: augmented reality (AR) content, virtual reality (VR) content, mixed reality (MR) content.

5. The first device of claim 1, wherein the first images show the left or right eye virtual content, according to the request, from a virtual perspective of a user while viewing the left or right eye virtual content using the second device, and wherein the second images show real-world content according to a field of view of a headset being used by the user to view both the left and right eye virtual content.

6. The first device of claim 1, wherein the instructions are executable to:
use timestamps to match respective frames of the first images to respective frames of the second images to generate the composite video.

7. The first device of claim 1, wherein the instructions are executable to:
stream the composite video to the third device responsive to receipt of a pin from the third device.

8. The first device of claim 7, wherein the instructions are executable to:
provide the pin to the first device for out-of-band sharing of the pin.

9. The first device of claim 1, wherein the instructions are executable to:
receive an audio stream from the second device; and
include the audio stream with the composite video streamed to the third device.

10. The first device of claim 1, wherein the instructions are executable to:

receive third images from the second device, the third images corresponding to content presented on a first display of the second device, the first images corresponding to the left or right eye virtual content, according to the request, as presented at a headset display in communication with the second device, the third images being different from the first images, the first display being different from the headset display; and stream, to the third device, the third images with the composite video.

11. The first device of claim 10, wherein the instructions are executable to:

stream, to the third device, the composite video and the third images together as a single video stream, the single video stream showing a first panel comprising the composite video and showing a second panel comprising the third images, the first panel being different from the second panel.

12. A method, comprising:

determining that a user is logged in, via a first device, to a streaming service;

based on the user being logged in to the streaming service, establishing a socket connection with the streaming service; and using the socket connection to transmit, to the streaming service, a first web real-time communication (WebRTC) stream that comprises first images associated with virtual content and a second WebRTC stream that comprises second images from a camera in communication with the first device, the second images comprising real-world red green blue (RGB) images from the camera, the first images comprising, according to a request from a second device different from the first device, one but not both of: left eye images from stereoscopic video data or right eye images from the stereoscopic video data.

13. The method of claim 12, comprising:

based on the user being logged in to the streaming service, providing a pin at the first device, the pin providing access from other devices to a composite video of the first and second images.

14. The method of claim 12, comprising:

using the socket connection to transmit, to the streaming service, a third WebRTC stream that comprises audio data, the audio data one or more of: produced by the first device and corresponding to the visual content, indicating a voice of the user as detected by a microphone in communication with the first device.

15. The method of claim 14, comprising:

using the socket connection to transmit, to the streaming service, a fourth WebRTC stream that comprises third images presented on a first display of the first device, the first display being different from a second display controlled by the first device to present the first images, the third images being different from the first images.

16. At least one computer readable storage medium (CRSM) that is not a transitory signal, the at least one computer readable storage medium comprising instructions executable by at least one processor to:

send a request, from a first device to a second device, for one of: left-eye virtual content or right-eye virtual content;

receive, at the first device and from the second device, a first stream comprising first images showing, according to the request, one of: the left-eye virtual content or the right-eye virtual content;

receive, at the first device and from the second device, a second stream comprising second images from a camera in communication with the second device, the second images comprising real-world red green blue (RGB) images from the camera;

execute alpha blending to generate a composite video in which the first images are overlaid, with at least partial transparency, on the second images; and stream the composite video to a third device different from the first and second devices.

17. The at least one CRSM of claim 16, wherein the first images show the left or right eye virtual content, according to the request, from a perspective of a user while viewing the virtual content using the second device, and wherein the second images show real-world content according to a field of view of a headset being used by the user to view both the left eye and right eye virtual content.

18. The at least one CRSM of claim 16, wherein the instructions are executable to:

receive third images from the second device, the third images corresponding to content presented on a first display of the second device, the first images corresponding to virtual content presented at a headset display in communication with the second device, the third images being different from the first images, the first display being different from the headset display; and stream, to the third device, the third images with the composite video.

19. The at least one CRSM of claim 18, wherein the instructions are executable to:

stream, to the third device, the composite video and the third images together as a single video stream, the single video stream showing a first panel comprising the composite video and showing a second panel comprising the third images, the first panel being different from the second panel.

* * * * *